United States Patent Office 3,472,603
Patented Oct. 14, 1969

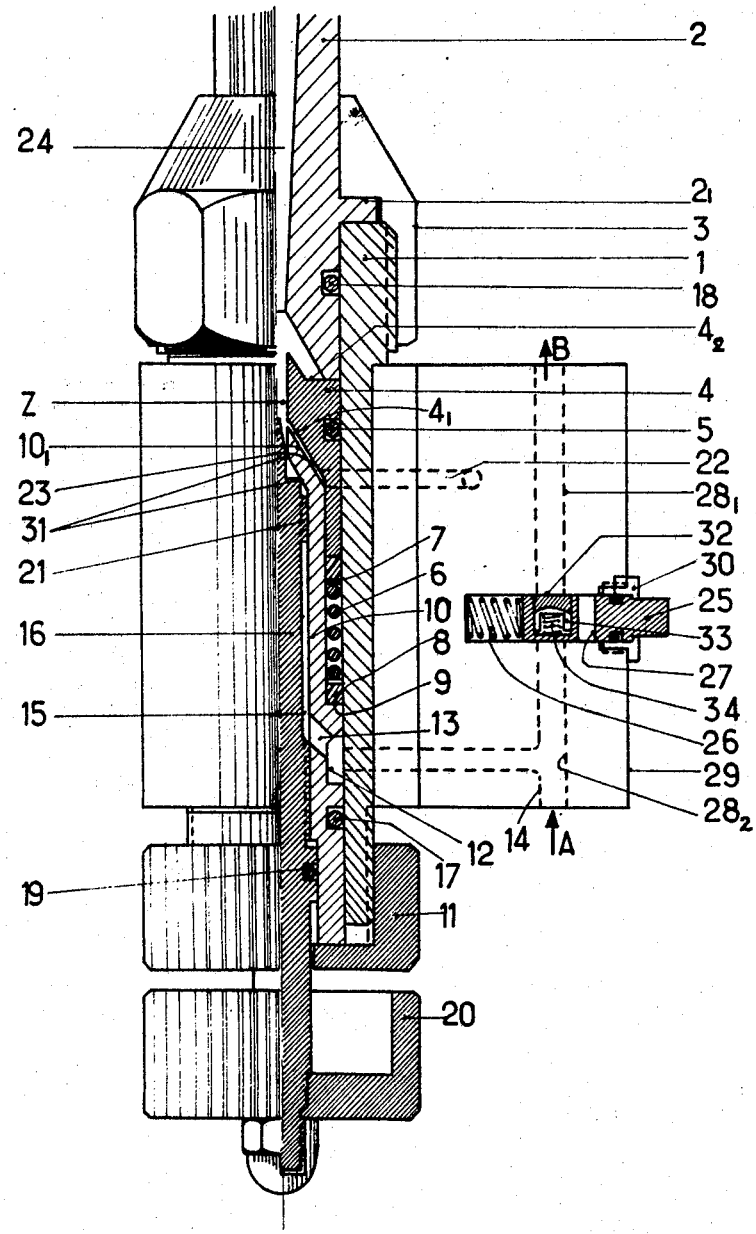

3,472,603
WELDING AND CUTTING BLOW-LAMP
Henri M. N. C. Bodot and Robert M. G. Langer, both of 352 Rue de Metz, Mondelange, France
Filed May 18, 1967, Ser. No. 639,560
Claims priority, application France, May 28, 1966, 574
Int. Cl. F23d *13/46*
U.S. Cl. 431—346                7 Claims

ABSTRACT OF THE DISCLOSURE

The invention is a welding and cutting blow-torch, having a mixing chamber, a fuel inlet feeding into the mixing chamber, and an oxygen inlet also feeding into the mixing chamber. The tubular body of the blow torch comprises an inwardly enclosed tubular casing and a slidable valve means, the casing and valve means defining the fuel inlet and oxygen inlet passageways. The slidable valve automatically acts to cut off fuel in the event of blow-back in the torch. Valving means are also provided for delivery of oxygen directly to the torch nozzle for cutting metals.

---

The invention relates more particularly to a welding and cutting blow-lamp formed of an external tubular body inside of which are arranged, coaxially, on the one hand, a distributor casing urged forward by a resilient means, and on the other hand, a mobile injector in relation to the distributor casing and moved by means of an exterior driving member and finally a middle needle, also mobile, operated from the exterior, these various means defining, between them, combustive and fuel intake chambers, emerging in a common mixing chamber, the blow-lamp also comprising a switching means for directly connecting up the combustive intake, when said blow-lamp is used for cutting, and which forms a compact appliance, all the parts being in line, economical and of optimum output.

According to one characteristic of the invention, the terminal face of the distributor casing, turned towards the mixing chamber, is provided with a means such as an annular spout channeling eventual backflashes which thus abruptly strike this terminal face causing the casing to recoil, until it abuts against the tapered internal end of the injector at the exact spot where the combustive intake duct emerges, thus blocking the latter.

According to another characteristic of the invention, the injector is transferred by screwing or unscrewing an external hand-wheel, said injector being drilled with several equidistant holes, ensuring the communication of the combustive, coming through an annular channel made between the external body of the blow-lamp and the outside wall of the injector, with the longitudinal chamber, delimited between the inner wall of this injector and the outer wall of the middle needle.

Other objects and advantages will be revealed by the description hereafter, claims and attached drawing showing a welding and cutting blow-lamp partly in section, the plane part being symmetrical to the cut-away part.

One of the essential objects of the invention lies in the manufacturing of a blow-lamp that can be used both for welding as well as cutting, and which above all is safe to operate thanks to an explosion non-return device, said blow-lamp comprising, on the other hand, means enabling the delivery of fuel and combustive to be regulated as well as a distribution means for ensuring the direct connecting up of the combustive, when the blow-lamp is required to be used for cutting.

According to one non-restrictive method of embodiment, the blow-lamp is made with an external body 1, extending in a longitudinal plane, the frontal end of this body abutting against a projecting annular collar $2_1$ with which the mixer body 2 is provided, these two parts, external body 1 and body of the mixer 2, being assembled by means of a nut 3.

Inside the tubular body 1 there is inserted in a coaxial manner, the non-return distributor 4 in the shape of a casing, seal-tightness between the outer wall of this distributor and the inner wall of the external body 1 being effected by a toric joint 5.

This distributor is steadily applied by its frontal face $4_2$, against the rear face of the mixer body 2, by a push-spring 6, one of whose ends bears against the ring 7, whereas the other end abuts against a seal-tight ring 8 resting in the end of the annular channel 9, delimited between the inner wall of the tubular body 1 and the outer wall of the injector 10.

The injector itself 10 can be moved sideways, in relation to the distributor body 4, its movement being ensured by means of outside control, such as a hand-wheel or milled knob 11.

On the external periphery of the injector 10, an annular channel 12 is made by machining, in whose end there are four equidistant holes 13, which ensure the communicating of the combustive (oxygen) entering through the duct 14 and emerging in the annular channel 12, with a chamber 15, also annular, provided between the inner wall of the injector 10 and the external periphery of the middle needle 16.

A second toric joint 17 ensures seal-tightness between the injector 10 and the tubular body 1, while at the top part a third toric joint 18 ensures seal-tightness between the mixer body 2 and this tubular body 1.

The middle needle, whose seal-tightness in relation to the injector is ensured by a toric joint 19, can be moved axially, its movement being ensured by an external maneuvering member, such as a hand-wheel or milled knob 20.

The guiding of the middle needle is ensured by means of guides 21, spaced out at various points on the periphery of said needle.

The fuel is introduced into the blow-lamp by an independent duct 22 which emerges in the annular space or in the annular cleft 23, delimited between the tapered external wall $10_1$ of the injector and the also tapered internal wall $4_1$ of the distributor body 4.

The annular chamber 15 which channels the combustive, emerges at the top part of the distributor body 4, so that in the zone Z, this combustive encounters the fuel channeled into the cleft 23. The mixture then actually takes place in the chamber 24 of the mixer, then in the heating tube (not shown).

The switching means enabling the welding blow-lamp to be used as a cutter, is essentially formed of a mobile slide-valve 25 impelled by a resilient means, such as a spring 26, said slide-valve being traversed with an orifice 27 able to be placed (when the slide-valve 25 is pushed in) facing two ducts in line $28_1$ and $28_2$.

The distribution slide-valve is kept in position by a nut 30.

On stopping, the hand-wheels 11 and 20 being closed, the spring 6 is compressed.

The external tapered part $10_1$ of the injector is pressed against the tapered part $4_1$ of the distributor body 4, which closes the fuel intake duct 22, seeing that the annular cleft 23 no longer exists.

The middle needle 16 is also pressed against the inner cone of the injector 10, so as to come into peripheric contact with the latter at one or several points 31, in order to prevent the intake of combustive in the common mixing chamber 24.

If the hand-wheel 11 is unscrewed, the push spring decompresses and makes the injector 10 recoil, which comes away from the distributor body 4, again making the cleft 23 and enabling the fuel to pass delivered through the duct 22.

It is then possible to convey this fuel to the exit orifice of the blow-lamp nozzle.

To obtain a heating form, the hand-wheel 20 is unscrewed, which brings the middle needle 16 towards the rear, so as to disengage the annular chamber 15.

We thus obtain a meeting of combustive and fuel in the Z zone and their mixing in the common chamber 24.

The more that the hand-wheels 11 and 20 are unscrewed, the greater the heating power obtained, which enables a very close regulating of the fuel-combustive to be obtained.

This blow-lamp also comprises a safety appliance. Actually, in the event of a backlash, somehow occurring accidentally, the impact wave, returning through the heating tube (not shown) and the mixer 2, sharply strikes the frontal face $4_2$ of the non-return distributor body 4, thus making the latter recoil, which compresses the push spring 6 in its movement, hence there results, on the one hand, a momentary stopping of the fuel intake, and on the other, the blowing out the flame, by the arriving of the combustive alone through the annular chamber 15 of the injector 10, which has remained freed by the middle needle 16. On raising the blow-lamp, the flame being extinguished, the push spring 6 which decompresses, sends the non-return distributor back to its initial position, i.e., that shown in the attached figure.

The blow-lamp can be re-lit, it being, however, pointed out that the regulating of the gaseous mixture remains identical to what it was before the back-flash.

When the blow-lamp is required for cutting, by utilizing the direct cut jet device, the distributor is maneuvered, by pressing on the distribution slide-valve 25, which then compresses the push spring 26, the orifice 27 thus coming in front of the two ducts in line $28_1$ and $28_2$, for ensuring communication between them, thus affording a direct passage for the combustive along the axis A–B, thus setting up a cutting power increased by direct jet, i.e., by an unbroken jet of oxygen.

By releasing the pressure applied to the slide-valve 25, the spring 26, by decompressing, causes the slide-valve to recoil and closes the ducts $28_1$ and $28_2$, by a neoprene capsule 32 and a push-button cupel 33 and a cupel spring 34.

The interest of the construction of this blow-lamp also lies in the fact that all the parts are tubular and longitudinal and that the central distribution (fuel, combustive) is in line, which enables the shape of the blow-lamp to be altered by eliminating all uneven surfaces, and thus the risk of said blow-lamp becoming hooked up.

Finally, this blow-lamp affords the following advantages:

An equipment in line (minimum space required),
Combustive and fuel delivery regulated (variable closing),
Safety resulting from the distribution body cutting off the fuel intake in the event of a back-flash,
Rapid conversion of the welding blow-lamp into a cutting blow-lamp by direct jet of the combustive.

Of course, the invention is not restricted to the examples of embodiment described and shown above, for which other alternatives can be provided, without going outside of the scope of the invention for that purpose.

What we claim is:

1. A welding and cutting blow-lamp comprising a tubular external body inside which is placed in a coaxial manner, a distributor casing resiliently biased forwardly by a resilient means and having a frontal face, an injector axially movable in relation to the distributor casing, the injector being movable by means of an external controlling member and forming between it and said frontal face a fuel intake chamber, and an axially movable needle valve, said valve being axially movable and controllable from the exterior and defining between it and the injector a combustive gas intake chamber, the combustive gas and fuel intake chambers emerging in a common mixing chamber, and means adapting the distributor casing to move backwardly to shut off the fuel intake chamber while the combustive intake chamber remains unchanged.

2. A welding and cutting blow-lamp according to claim 1, in which the frontal face of the distributor casing is provided with a means channeling eventual flash-backs which sharply strike on the frontal face of the distributor casing causing the distributor casing to recoil until it abuts against the end of the injector to close the fuel intake chamber.

3. A welding and cutting blow-lamp according to claim 1 in which the injector is adapted to be moved axially by movement of an external hand-wheel, said injector being provided with several orifices therethrough to permit combustive gas to flow from an annular duct, provided between the external body of the blow-lamp and the external wall of the injector, into the longitudinal chamber defined between the inner wall of the injector and the outer wall of the needle valve.

4. A welding and cutting blow-lamp according to claim 1 in which the needle valve can be moved axially, by means of an externally operated hand-wheel, to abut against the inner end of the injector to close the combustive passage defined by the end of the injector and said needle valve.

5. A welding and cutting torch comprising a tubular external body, a distributor casing mounted internally thereof and coaxial therewith, the distributor casing being resiliently biased in a forward direction by resilient means, an injector member axially mounted in said body and within said distributor casing, the injector member being axially movable in a forward and backward direction by means of an external adjusting member and being resiliently biased in said backward direction, and a needle valve member coaxially mounted within said injector, said needle valve member being axially movable in a forward and backward direction with respect to said injector member by means of an external adjusting member, the distributor casing and the injector member defining between them at their ends an inwardly leading passageway for combustible fuel, the needle valve member and the injector member defining between them at their ends an inwardly extending passageway for a combustive material, the torch also including a valving means for connecting said combustive gas directly to the head of said torch for cutting purposes.

6. A welding and cutting torch according to claim 5, in which said valving means consists of a movable distribution slide-valve adapted for directly connecting the combustive gas intake, to the head of the torch, said slide-valve being traversed by an orifice, and said torch being provided with two ducts axially aligned, the orifice being adapted to connect said ducts in one position of the valve, but said ducts being blocked by the valve when in a second position.

7. A welding and cutting blow-lamp according to claim 6 in which the distribution slide-valve is biased to said second position by a resilient means.

References Cited

UNITED STATES PATENTS 904,452    11/1908    Roberts et al. _____ 239—417
985,159    2/1911     Goodyear _____ 239—417

FOREIGN PATENTS 676,301    7/1952     Great Britain.

EDWARD G. FAVORS, Primary Examiner

U.S. Cl. X.R.

239—411